United States Patent
Wang

Patent Number: 5,253,496
Date of Patent: Oct. 19, 1993

[54] SIMPLE BICYCLE LOCK STRUCTURE

[76] Inventor: Teng-Yun Wang, P.O. Box 96-405, Taipei 10098, Taiwan

[21] Appl. No.: 866,859

[22] Filed: Apr. 10, 1992

[51] Int. Cl.$^5$ ............................................ E05B 67/12
[52] U.S. Cl. ..................................... 70/38 R; 70/41; 70/43; 70/46; 70/53
[58] Field of Search ........................................ 70/27–29, 70/35, 38 R, 38 B, 38 C, 41, 43, 46, 51, 53

[56] References Cited

U.S. PATENT DOCUMENTS

| | | | |
|---|---|---|---|
| 4,064,716 | 12/1977 | Shwayder et al. | 70/53 X |
| 4,615,191 | 10/1986 | Grandy | 70/26 |
| 4,730,470 | 3/1988 | Zane et al. | 70/41 X |
| 4,986,095 | 1/1991 | Chou et al. | 70/46 X |
| 4,987,753 | 1/1991 | Kuo | 70/41 X |

*Primary Examiner*—Lloyd A. Gall

[57] ABSTRACT

A simple bicycle lock structure which comprises an outer cylinder and a shackle; one end of the outer cylinder is mounted with a locking assembly, while the other end thereof is mounted with an outer-cylinder-positioning assembly, in which a movable sleeve has a through hole, being perpendicular to a pin hole; the through hole is in communication with a round hole on the outer cylinder. The shackle has a rotary section which is perpendicular to the shackle body; the rotary section includes a circular groove and a symmetrical groove; after the rotary section is inserted in the movable sleeve, a fixing pin will be engaged with the rotary section in a pivotal manner. Other end of the shackle has a locking section with a locking groove and a bevel facet. As soon as the locking section is inserted into a round hole on the outer cylinder, the locking section will be engaged with the locking assembly to become locked up.

3 Claims, 5 Drawing Sheets

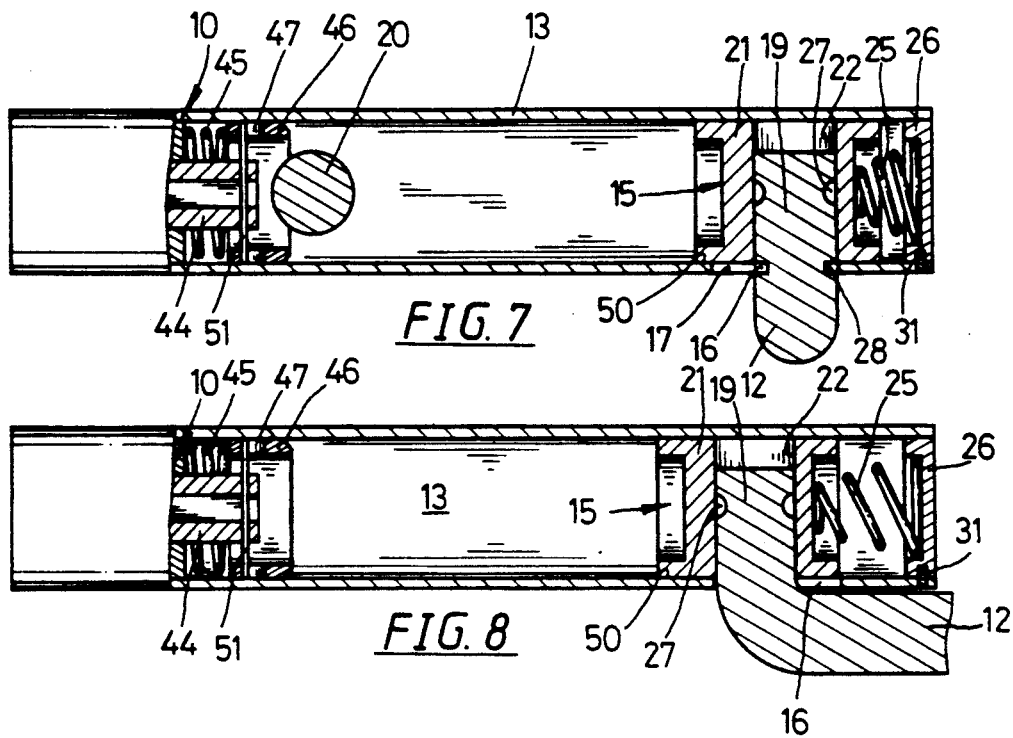
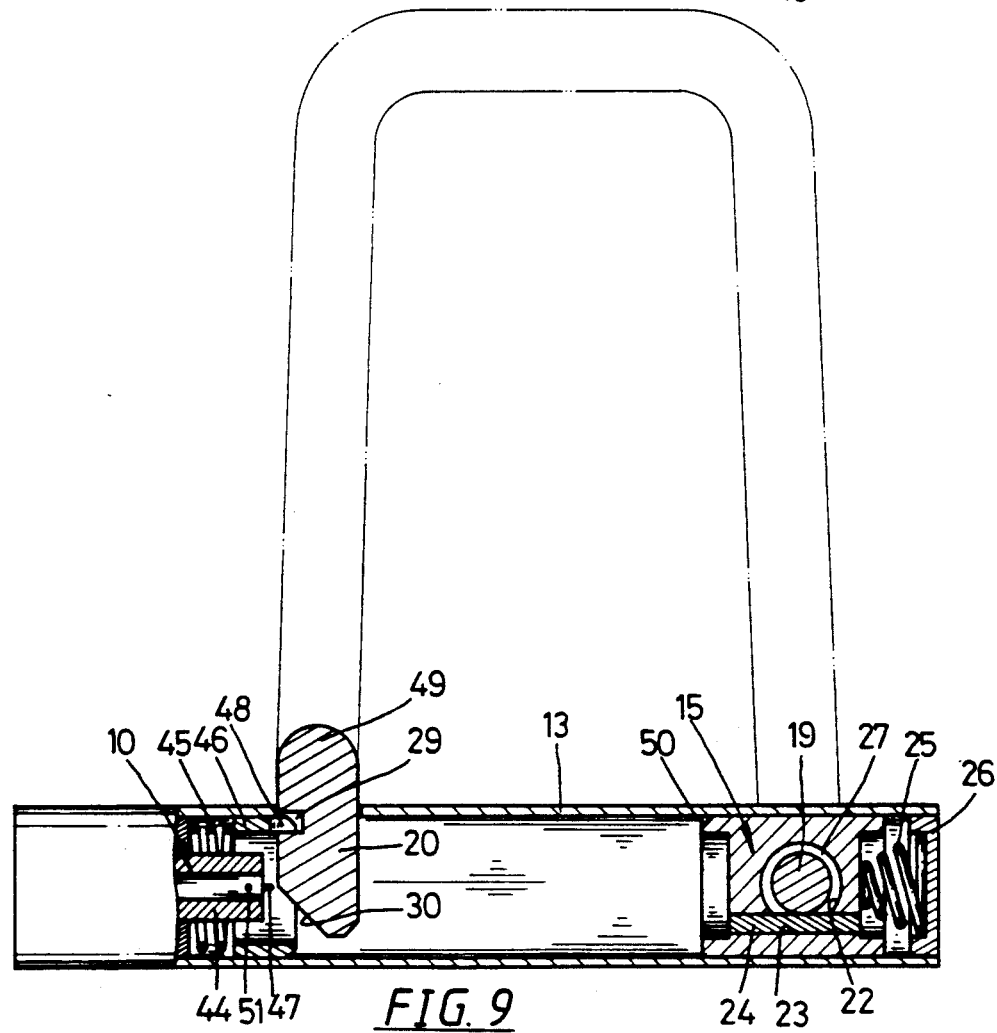

SIMPLE BICYCLE LOCK STRUCTURE

BACKGROUND OF THE INVENTION

1. Field of the Invention

This invention relates to a lock structure, and particularly to a lock, of which the shackle can be fixed to the rear fork of a bicycle. A positioning function is furnished between the outer cylinder and the shackle of the lock upon the same being in unlocking condition.

2. Description of the Prior Art

Generally, a conventional bicycle lock comprises a lock body and a chain or the like to be attached to one end of the lock body. In U.S. Pat. No. 4,615,191, one end of a chain or the like is attached to the lock body by means of a ring. Normally, the lock is fastened on a suitable part of a bicycle. To lock the bicycle, the chain of the lock will be mounted around a wheel of the bicycle, while both ends of the chain are fastened in the lock body to prevent the bicycle wheel from turning.

The aforesaid lock does have its features, such as to facilitate a bicycle to be locked up around a rail or the like which is not a part of the bicycle; however, such a lock also has a drawback of causing inconvenience to a user, such as the lock must be put or fastened to a place after each use, and the chain has to be fastened around a wheel of the bicycle at each use.

There is another conventional bicycle lock, which has a U-shaped shackle; both sides of the U-shaped shackle have an equal length, and the ends of the shackle have two locking grooves respectively. The lock also has a tubular locking assembly. The opening end of the shackle is to be put over the rear fork and the wheel spokes before being locked up with a locking assembly thereof; then, a bicycle will be unable to move.

The aforesaid bicycle lock has to let the opening of the U-shaped shackle to pass across the rear fork of a bicycle before being locked together with a locking assembly thereof; since such a lock has no fastener for attaching it on a bicycle, there must be a space or a member to hold the lock in place during the bicycle being not locked, and it is deemed a drawback for such a lock because of causing inconvenience.

SUMMARY OF THE INVENTION

The prime feature of the present invention is that the lock according to the present invention has a U-shaped shackle or a shackle being fitted on the rear fork of a bicycle, which can be fixedly attached to the rear fork of a bicycle by means of a lock-mounting ring. The non-opening end of the U-shaped shackle is mounted over a wheel or a mud-guard of a wheel. One end of the shackle is pivotally connected with the outer cylinder of the lock. A positioning assembly in the outer cylinder is used for retaining the outer cylinder at a given position. To lock up, the outer cylinder can be turned to engage with the locking portion of shackle.

Another feature of the present invention is that one end of the shackle is bent at an angle of 90°. The rotary section of the shackle is pivotally connected with an outer-cylinder-positioning assembly. The other end of the shackle has a locking section, which is in parallel with the shackle; both of them are connected together with an extended portion. When the locking section is turned, it will move towards a round hole on the top of the outer cylinder. The lock is to be fixed to the rear fork of a bicycle by means of a lock-mounting ring. The outer cylinder is attached to one end of the shackle in a rotary manner.

Still another feature of the present invention is that the rotary section of the shackle is bent at an angle of 90°, and has a circular groove and a symmetrical groove, whereby the outer cylinder can be set at a given position after being turned. The circular groove is to be engaged with an outer-cylinder-positioning assembly inside the outer cylinder.

A future feature of the present invention is that, in addition to one end of the shackle being not on the same plane, the other end thereof has a locking section with a locking groove and a bevel facet, which are to be inserted into a round hole on the outer cylinder so as to engage with a locking assembly therein.

A still further feature of the present invention is that one end of the outer cylinder is mounted with an outer-cylinder-positioning assembly, of which the movable sleeve has a through hole being in communication with and perpendicular to a pin hole; the through hole is an alignment with a round hole on the outer cylinder. The rotary section is perpendicular to the shackle (at an angle of 90°). The rotary section has a circular groove and a symmetrical groove; after the rotary section is inserted into the movable sleeve, a fixing pin will be fitted in the circular groove to have the shackle retained in place in a rotary manner. In order to enable the outer cylinder to be set at a position after the lock being unlocked, the round hole of the outer cylinder has a position-displacement slot at one side thereof, while the rotary section has a symmetrical groove. As soon as the outer cylinder is set at unlocked position and turned at an angle of 90°, the position-displacement slot will be opposite to the symmetrical groove. Since the outer-cylinder-positioning assembly has a spring inside the movable sleeve, the spring would cause the position-displacement groove to engage with the symmetrical groove to have the outer cylinder retained at a position designed.

BRIEF DESCRIPTION OF THE DRAWINGS

FIG. 7 is a sectional view of the present invention, showing the shackle and outer cylinder being in lock-up condition.

FIG. 8 is a cross-section view of the present invention, showing the shackle and the outer cylinder being turned to set at a fixed position.

FIG. 9 is a longitudinal-section view of the present invention, showing the shackle and the outer cylinder being in lock-up condition.

DETAILED DESCRIPTION OF THE PREFERRED EMBODIMENTS

Figure 1:
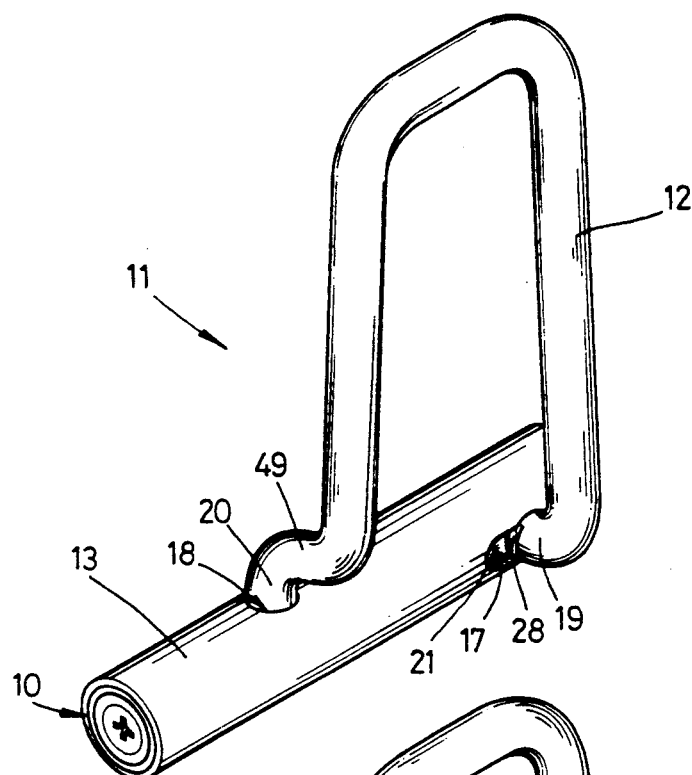
FIG. 1 is a perspective view of an embodiment according to the present invention.
Figure 2:
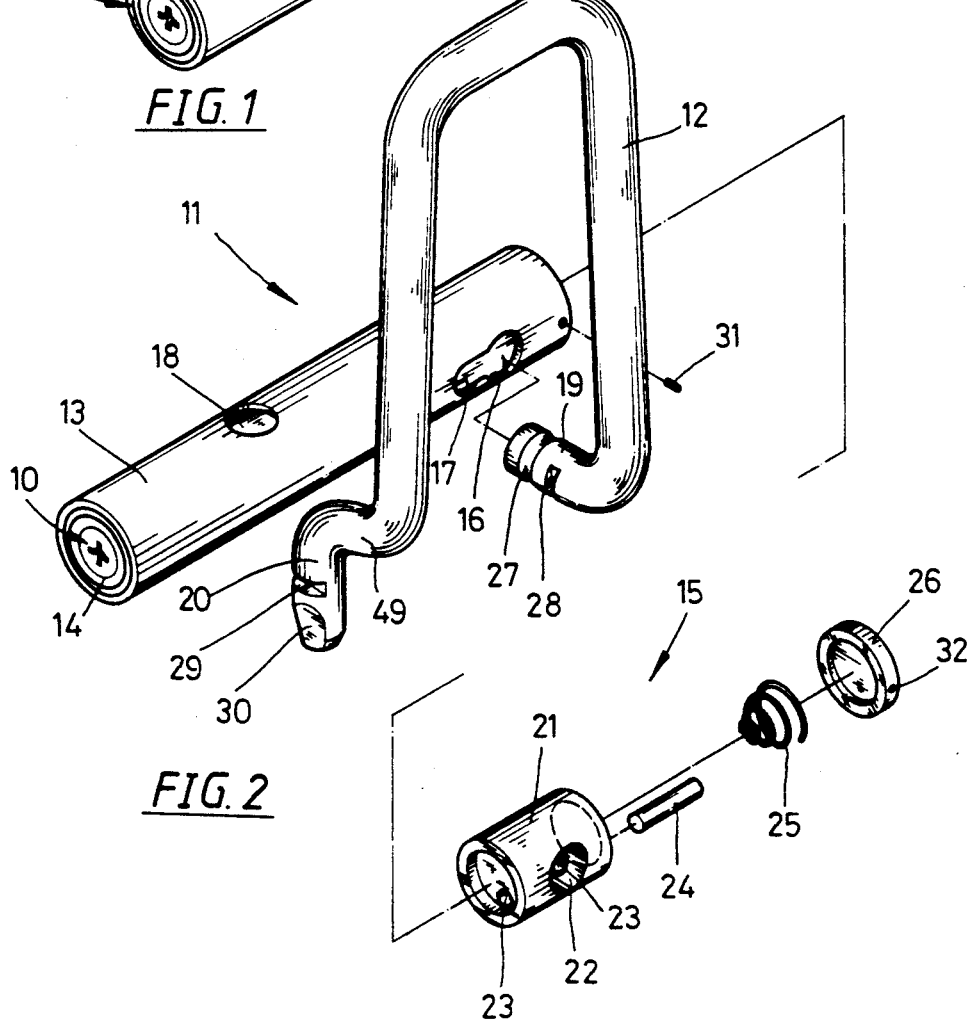
FIG. 2 is a disassembled view of the embodiment according to the present invention.
Figure 3:
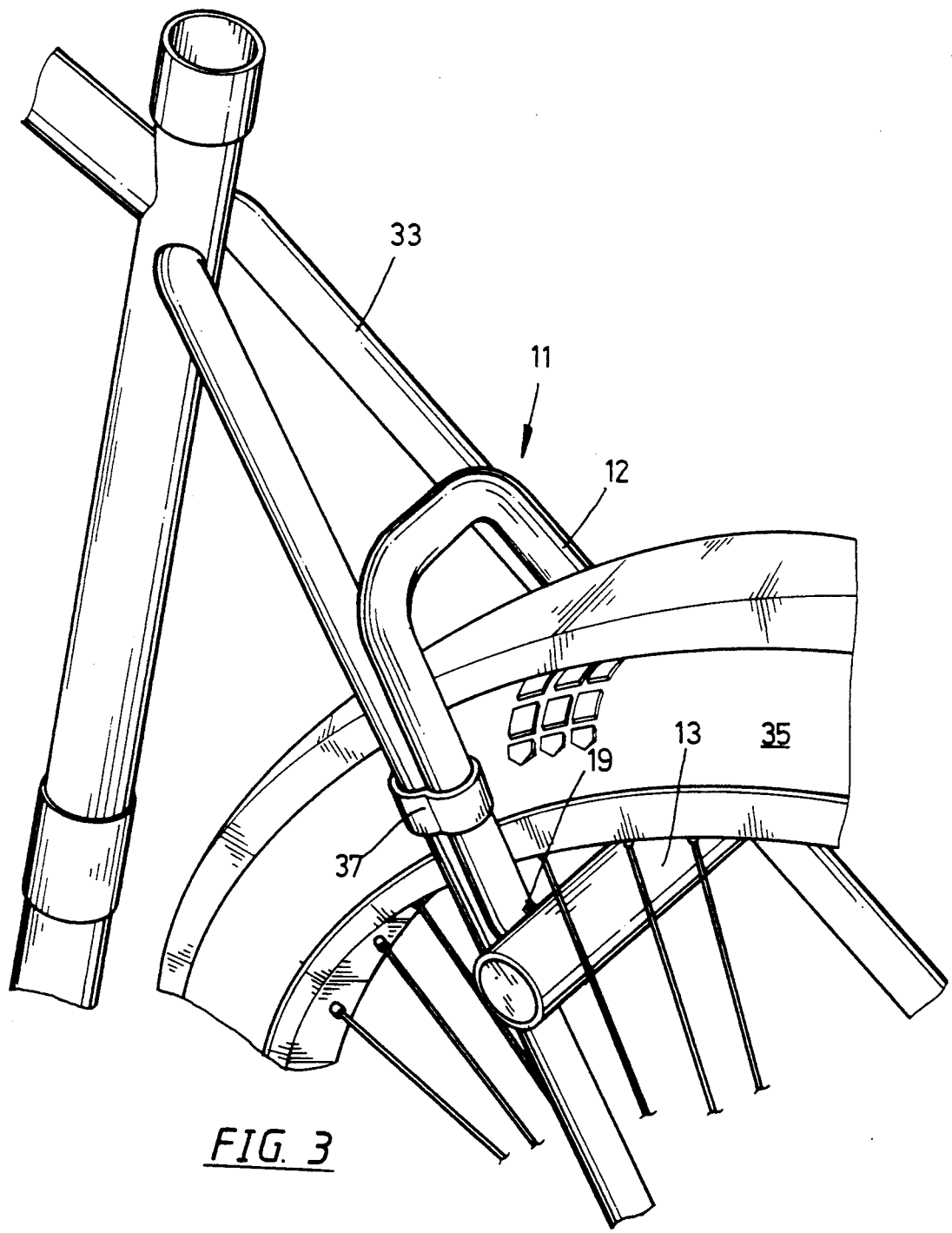
FIG. 3 illustrates the present invention, being mounted on the rear fork of a bicycle.
Figure 4:
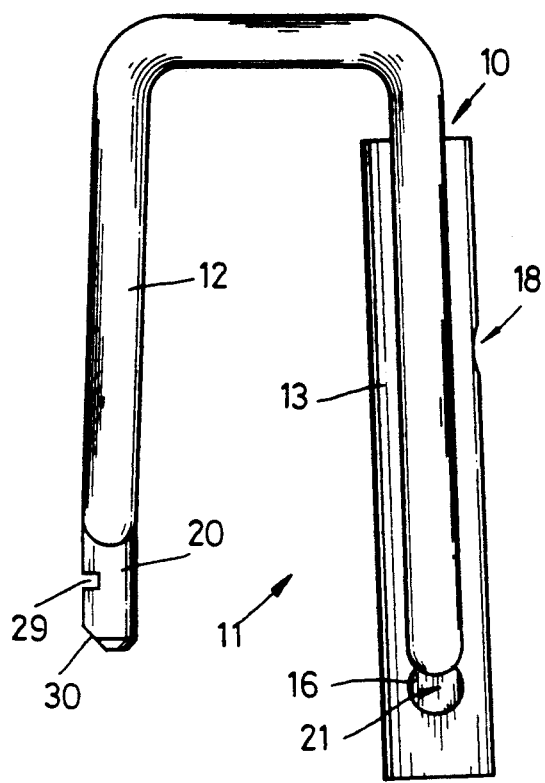
FIG. 4 illustrates the present invention being set in position-1.
Figure 5:
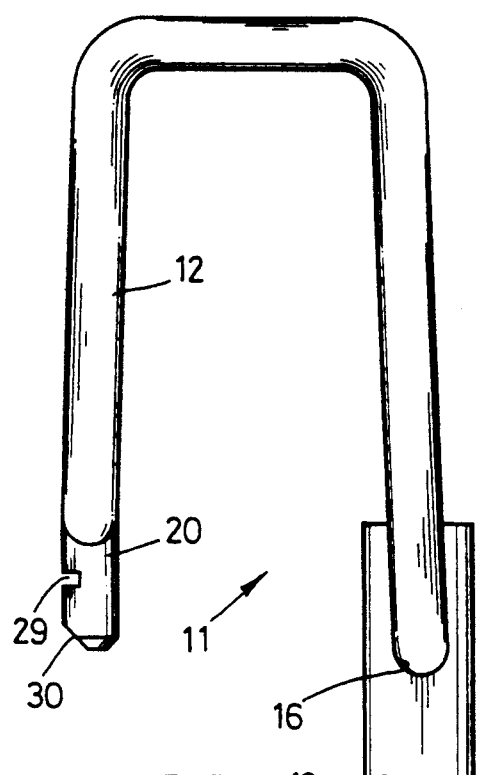
FIG. 5 illustrates the present invention being set in position-2.
Figure 6:
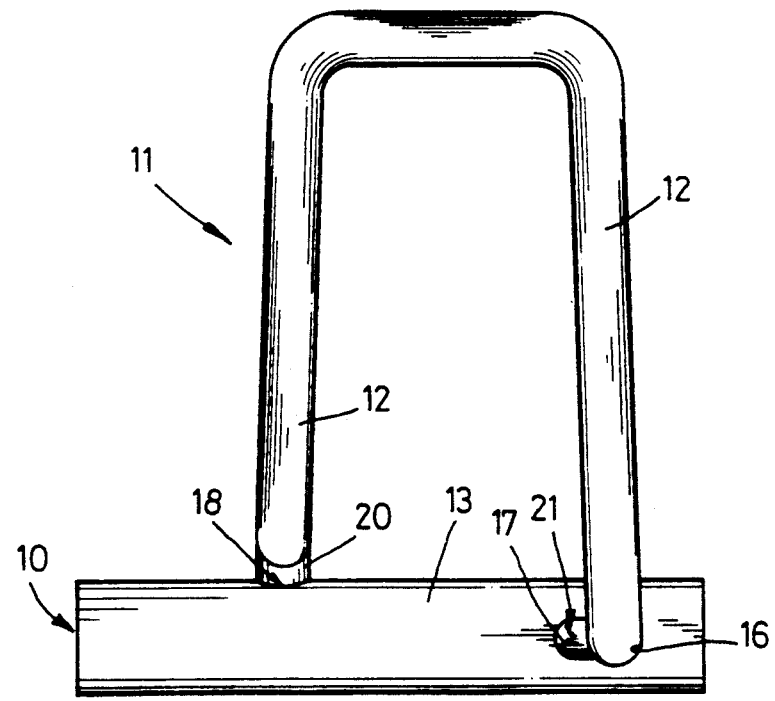
FIG. 6 illustrates the present invention being in lock-up condition.

As shown in FIGS. 1 to 6, the lock 11 according to the present invention has a U-shaped shackle 12, which is formed into a shape to fit the shape of the rear fork 33 of a bicycle, and is fastened in place with two lock-mounting rings 37 attached to the rear fork 33. The rotary section 19 of shackle 12 and an outer cylinder positioning assembly 15 in the outer cylinder 13 are formed into a rotary-and-shifting assembly; the locking section 20 of the shackle is to be inserted in a round hole 18 on the outer cylinder 13 to engage with a locking assembly 10 in one end of the outer cylinder 13 so as to provide a locking or unlocking function. FIG. 3 illustrates the lock 11, being fastened to the rear fork 33 of a bicycle. As shown in FIGS. 4 and 5, the outer cylinder 13 can be set at a given angle by means of an outer cylinder positioning assembly during a bicycle being used normally.

The bicycle lock according to the present invention is to be fixed on the rear fork 33 of a bicycle by means of two lock-mounting rings 37 to fasten the shackle 12 on the fork 33. Since the rear fork 33 is also a part where a brake assembly is to be mounted, the shackle 12 and the outer cylinder 13 may not be installed at a same level, i.e., the shackle 12 may be mounted at a suitable position selected on the rear fork 33.

As shown in FIGS. 2, 7 and 9, one end of the outer cylinder 13 of the lock 11 is installed with the outer-cylinder-positioning assembly 15, while the other end thereof is installed with a locking assembly 10. The outer-cylinder-positioning assembly 15 includes a movable sleeve 21, a fixing pin 24, a spring 25 and an end plug 26. The movable sleeve 21 is a cylindrical member to be in the outer cylinder 13; a play exists between the outer surface of the movable sleeve 21 and the outer cylinder 13. One side of the movable sleeve 21 has a through hole 22, which is in alignment with a round hole 16 on one side of the outer cylinder 13 for receiving the rotary section 19 of the shackle 12. The movable sleeve 21 has a pin hole 23 in tangential contact with one side of the through hole 22; a fixing pin 24 is to be mounted in the pin hole 23 so as to mount the rotary section 19 in the through hole 22 in a pivotal manner. The movable sleeve 21 can be moved in a spring-load manner by means of a spring 25 and an end plug 26 that is mounted in place with a pin hole 32 and a pin 31 on the outer cylinder 13.

The outer-cylinder-positioning assembly 15 in the outer cylinder 13 is used for providing the rotary section 19 of the shackle 12 with a rotary manner. The outer cylinder 13 has a round hole 16 in communication and alignment with the through hole 22 in the movable sleeve 21. The round hole 16 provides the shackle 12 with a positioning function upon a bicycle being in use condition. One side of the round hole 16 has a position-displacement slot 17. The rotary section 19 of the shackle 12 to be connected with the outer-cylinder-positioning assembly 15 is formed at an angle of 90°; the end of the rotary section 19 has a circular groove 27, which is opposite to the pin hole 23 in the movable sleeve 21 after the rotary section being inserted in the through hole 22; as soon as a fixing pin 24 is fitted in the pin hole 23, the circular groove 27 of the rotary section 19 will be mated with the pin 24 to prevent the shackle 12 from being pulled out of the through hole 22 completely. Since the groove 27 is a circular groove, the shackle 12 can be turned freely along the fixing pin 24.

The rotary section 19 at one end of the shackle 12 is a 90° elbow-shaped part, being pivotally connected with the outer-cylinder-positioning assembly 15. The shackle 12 is not on the same plane as that of the outer cylinder 13. The rotary section 19 of the shackle 12 is a rotary member so as to have the other end of the shackle engaged with the locking assembly 10 in the outer cylinder 13.

The upper side of the outer cylinder 13 has a round hole 18, which is in perpendicular position to the round hole 16 for receiving the rotary section 19, i.e., the round hole 16 is on one side of the outer cylinder 13. The round hole 18 on the upper side of the outer cylinder 13 is used for receiving the locking section 20 of the shackle 12 to be engaged with a locking assembly 10. The locking section 20 is arranged in parallel with the shackle 12 body; both of them are connected together by means of an extended portion 49. Since the shackle 12 is pivotally connected together with the outer cylinder 13 by means of the rotary section 19, the locking section 20 can directly be inserted in the round hole 18 upon the locking section 20 being turned to the lock-up position; then, the locking section 20 will be engaged together with the locking assembly 10.

The locking assembly 10 as shown in FIGS,. 7 to 12 includes a lock cylinder 14 which is fixed in the outer cylinder 13 by means of a pin 43; a rotary cylinder 39 in the lock cylinder 14 has an inner portion 44, of which one end is mounted with a locking collar 46 by means of a pin 51. The locking coller 46 has a guide groove 47 to be mated with the pin 51. A spring 45 is mounted between the locking collar 46 and the locking cylinder 14 so as to provide the locking collar 46 with an outward pushing force. The rotation of the locking collar 46 is controlled with the locking cylinder 14 for locking up with the locking section 20, or unlocking upon the locking cylinder 14 being turned to actuate the locking collar 46.

The structure of lock 11 for bicycle is shown in FIG. 2; the rotary section 19 has a symmetrical groove 28 opposite to the position-displacement slot 17. When a bicycle is in use, the symmetrical groove 28 can be used to set the outer cylinder 13 in a position as shown in FIG. 4, i.e., the locking assembly 10 facing upwards, or as shown in FIGS. 5 and 8, i.e., the locking assembly 10 facing downwards. The positioning function between the outer cylinder 13 and the shackle 12 is to be done by means of the outer-cylinder-positioning assembly 15 and the rotary section 19; when the outer cylinder 13 is turning, the rotary section 19 can be rotated in the round hole 16. As soon as the outer cylinder 13 is turned to an angle, where the position-displacement slot 17 of the round hole 16 is opposite to the symmetrical groove 28 of the rotary section 19, the movable sleeve 21 will move as a result of a spring 25 therein to cause the position-displacement slot 17 and the symmetrical groove 28 of the rotary section 19 to engage together in a fixed position. The outer cylinder 13 and the shackle 12 upon being engaged in a fixed position can be disengaged from each other only when a suitable pressure is applied to the outer cylinder 13.

Figure 10:
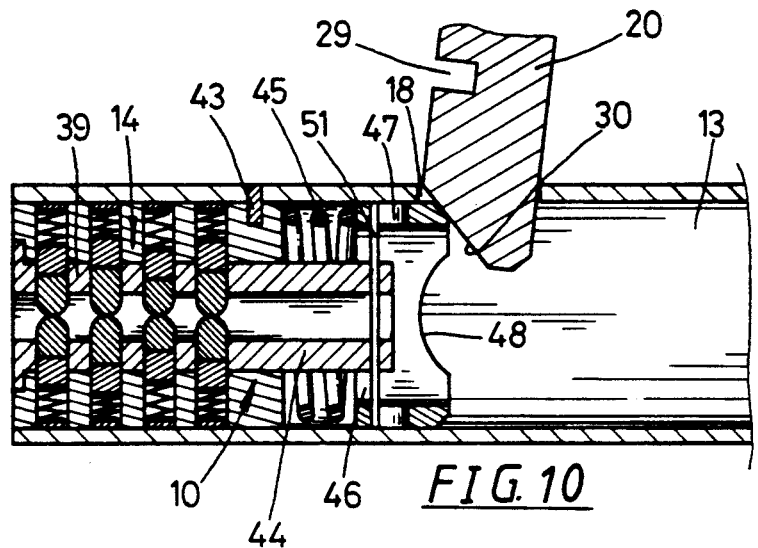
FIG. 10 is a fragmental section view, showing a locking section being inserted into a round hole on the outer cylinder of the lock.
Figure 11:
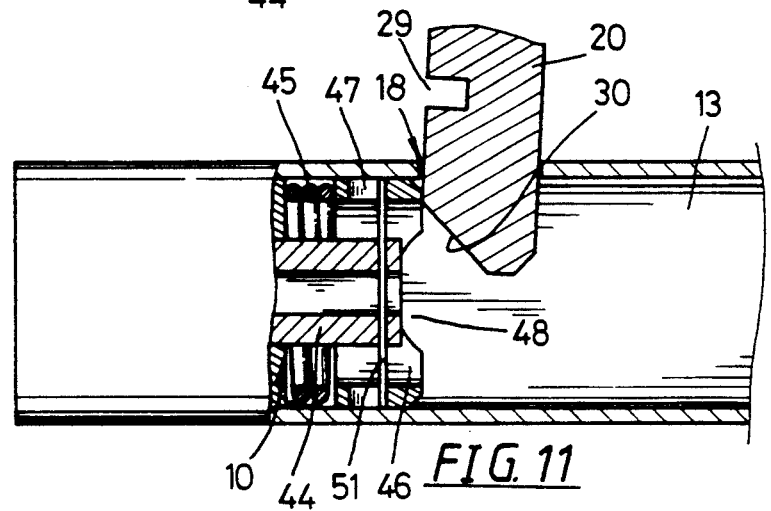
FIG. 11 is a fragmental section view, showing the locking section being inserted in the round hole to push a locking collar to move.
Figure 12:
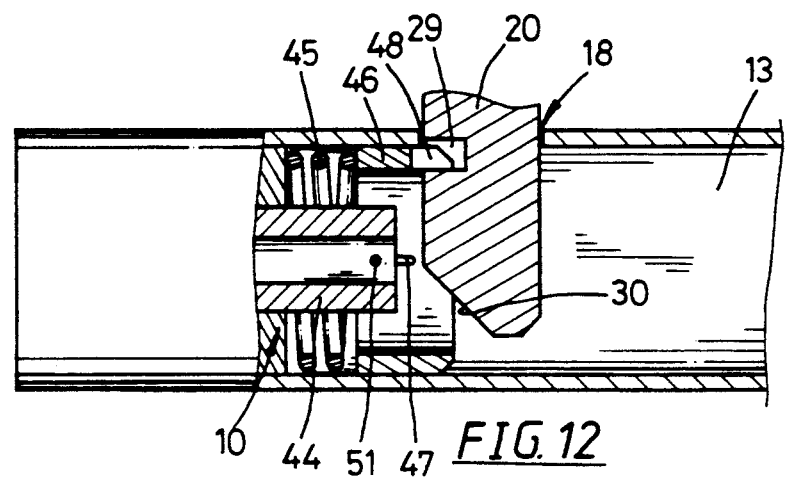
FIG. 12 is a fragmental section view, showing the locking section set in the round hole in lock-up condition.

A bicycle may be locked up after use; as shown in FIG. 4, the locking assembly 10 in the outer cylinder 13 is facing upwards, and the outer cylinder 13 is set in a fixed position by means of the outer-cylinder-positioning assembly 15; the outer cylinder 13 may be turned after being poushed upwards first. The outer cylinder can also be set in a position upon the locking assembly 10 facing downwards. In real use, the outer cylinder 13 is moved in a continuous rotation; as shown in FIG. 5, the outer cylinder 13 in a positioning state can still be turned with the aforesaid method. As shown in FIG. 10, as soon as the outer cylinder 13 is turned to pass through the bicycle wheel 35, the locking section 20 of the shackle 12 will be moved into the round hole 18 on the outer cylinder 13; the locking assembly 10 is in lock-up condition; in that case, the unlocking recess 48 of the locking collar 46 is not facing the round hole, but the bevel facet 30 of the locking section 20 would push the locking collar 46 loaded with a spring 45 to move away as shown in FIG. 11 until the locking groove 29 on the locking section 20 is engaged with the locking collar 46. When the lock 11 is unlocked as shown in FIG. 12, a key will be used to turn the rotary cylinder 39 and the inner portion 44 at an angle of 90°; then, the inner portion 44 will actuate the locking collar 46 by means of the pin 51 to rotate so as to have the unlocking recess 48 of the locking collar 46 aligned with the round hole 18 on the outer cylinder 13, and then the outer cylinder 13 will be turned to a stop position.

According to the embodiment of the present invention as mentioned above, the drawbacks of the conventional bicycle lock can be improved practically; the present invention is deemed a novel disclosure; however, any modification to the present invention by a person skilled in the art will be considered within the scope of the claims thereof.

I claim:

1. A simple bicycle lock structure comprising:
    a shackle being a U-shaped member to be mounted on a rear fork of a bicycle, and opening ends of said shackle including a rotary section and a locking section respectively; said rotary section being a 90° elbow-shaped member to be inserted in a hole of a movable sleeve in an outer-cylinder-positioning assembly fitted in an outer cylinder; said locking section of said shackle facing a round hole in an upper side of said outer cylinder; said shackle and said locking section being not on a same plane, but being connected together by means of an inner portion; and said locking section including a bevel facet and a locking groove to facilitate said locking section to enter a locking assembly through said round hole on the upper side of said outer cylinder;
    said outer cylinder including said outer-cylinder-positioning-assembly in one end thereof and said locking assembly in the other end thereof; said outer-cylinder-positioning assembly having said movable sleeve with said hole on one side thereof, which being in communication with a round hole on one side of said outer cylinder, and one side of said round hole on said outer cylinder having a position-displacement slot;
    said locking assembly including a lock cylinder and a rotary cylinder with an inner portion which is mounted with a locking collar by means of a pin; said locking collar having a guide groove for said pin; and a spring being mounted between said locking collar and said lock cylinder; said locking collar having an unlocking recess;
    said through hole of said movable sleeve being perpendicular to a pin hole for receiving a fixing pin, and said fixing pin to be engaged with a circular groove on said rotary section; said movable sleeve being in contact with a spring which is retained in place with an end plug to be fixed in said outer cylinder with a pin.

2. A simple bicycle lock structure as claimed in claim 1, wherein said rotary section including said circular groove and a symmetrical groove; and said circular groove being set beside said pin hole upon said circular groove being connected with said through hole of said movable sleeve; and said symmetrical groove of said rotary section being aligned with said position-displacement slot.

3. A simple bicycle lock structure as claimed in claim 1, wherein said position-displacement slot having a width slightly larger than the thickness of a symmetrical groove on said rotary section.

* * * * *